US009081814B1

(12) United States Patent
Carroll et al.

(10) Patent No.: US 9,081,814 B1
(45) Date of Patent: Jul. 14, 2015

(54) USING AN ENTITY DATABASE TO ANSWER ENTITY-TRIGGERING QUESTIONS

(71) Applicant: Google Inc., Mountain View, CA (US)

(72) Inventors: Melissa K. Carroll, White Plains, NY (US); John J. Lee, Long Island City, NY (US)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 13/795,652

(22) Filed: Mar. 12, 2013

Related U.S. Application Data

(60) Provisional application No. 61/654,559, filed on Jun. 1, 2012, provisional application No. 61/654,518, filed on Jun. 1, 2012.

(51) Int. Cl.
*G06F 7/00* (2006.01)
*G06F 17/30* (2006.01)
*G06F 17/27* (2006.01)

(52) U.S. Cl.
CPC ........ *G06F 17/30424* (2013.01); *G06F 17/278* (2013.01)

(58) Field of Classification Search
CPC ..... G06Q 30/02; G06Q 10/107; G06Q 50/01; G06Q 10/00; G06Q 10/06; G06Q 10/101; G06Q 10/02

USPC ......................................................... 707/702
See application file for complete search history.

(56) References Cited

U.S. PATENT DOCUMENTS

| | | |
|---|---|---|
| 2008/0162515 A1* | 7/2008 | Dovas et al. .................. 707/100 |
| 2009/0287678 A1 | 11/2009 | Brown et al. |
| 2009/0292687 A1 | 11/2009 | Fan et al. |
| 2011/0153312 A1 | 6/2011 | Roberts |
| 2011/0153324 A1 | 6/2011 | Ballinger et al. |
| 2011/0258230 A1 | 10/2011 | Jung et al. |
| 2012/0078891 A1 | 3/2012 | Brown et al. |
| 2012/0078902 A1 | 3/2012 | Duboue et al. |

* cited by examiner

*Primary Examiner* — Truong Vo
(74) *Attorney, Agent, or Firm* — Fish & Richardson P.C.

(57) ABSTRACT

An embodiment may receive a question at a computing device; obtain a search result set in response to the question; identify, using the computing device, one or more entities that are associated with at least one document referenced by the search result set; select, using the computing device, one or more relevant entities identified as being associated with (i) documents referenced by the search result set and (ii) the question; and output, using the computing device, an answer to the question based at least on the selected one or more entities.

21 Claims, 14 Drawing Sheets

| Document ID | Entities |
|---|---|
| D1 | Joe's Soup Kitchen |
| D2 | George Lucas, Star Wars |
| D3 | Washington Redskins, Toyota |
| ... | |

FIG. 6

USING AN ENTITY DATABASE TO ANSWER ENTITY-TRIGGERING QUESTIONS

CROSS-REFERENCE TO RELATED APPLICATIONS

This application claims the benefit of U.S. Provisional Applications 61/654,518, filed Jun. 1, 2012 and 61/654,559, filed Jun. 1, 2012, which are incorporated herein in their entirety by reference.

BACKGROUND

User devices, such as mobile telephones, implement a variety of techniques through which users can find information. For example, some user devices implement dialog systems, which may be able to provide answers to questions provided by users. In such systems, the device receives a question from a user. The answers to some questions may include information about an entity, such as a person, a business, a geographical location, or the like. Thus, to respond properly to such a question, the device needs to be able to provide appropriate information about an appropriate entity so as to be responsive to the question.

SUMMARY

According to some implementations, a method may include receiving a question at a computing device, determining that the question has been classified as an entity-triggering question, based on one or more terms of the question, and in response to determining that the question has been classified as an entity-triggering question: obtaining a search result set in response to the question, identifying, using the computing device, one or more entities that are associated with at least one document referenced by the search result set, selecting, using the computing device, one or more relevant entities identified as being associated with (i) documents referenced by the search result set and (ii) the question, and outputting, using the computing device, an answer to the question based at least on the selected one or more entities, wherein the answer references one or more attributes of one or more of the selected entities.

According to some implementations, the method may include scoring the relevant entities and selecting one or more entities that are responsive to the question based on the scoring.

According to some implementations, the scoring for an entity is based on information comprising one or more of: a quantity of search results in which the entity was identified, a proportion of search results in which the entity was identified, identifying identifiers for the entity in snippets associated with search results, a result score associated with a search result in which the entity was identified, a quantity of times that an identifier appears in a particular search result, whether the entity matches one or more terms for the question, and detecting that a particular search result is spam.

According to some implementations, identifying that an entity is associated with (i) the documents referenced by the search result set and (ii) the question includes determining that one or more terms of an entity identifier, associated with the entity, are identical or satisfies a similarity threshold to one or more terms of the question.

According to some implementations, identifying that an entity is associated with (i) the documents referenced by the search result set and (ii) the question includes determining that one or more terms of an attribute value, associated with the entity, are identical or satisfies a similarity threshold to one or more terms of the question.

According to some implementations, a question is determined to be an entity-triggering question based on at least one of determining that the question includes one or more terms from a set of terms associated with questions that are likely to be entity-triggering questions or determining that the question does not include one or more terms from a set of terms associated with questions that are not likely to be entity-triggering questions.

According to some implementations, the method further includes generating an answer document that comprises information about the search result set and the answer and displaying the answer document.

The above discussion mentions examples in which some implementations may be implemented via one or more methods. In some implementations, one or more systems and/or devices may be configured to perform one or more of the operations mentioned above. In some implementations, a non-transitory computer-readable storage medium storing software may include instructions executable by one or more computers which, upon such execution, cause the one or more computers to perform operations as discussed above.

By using one or more of the techniques described herein, a system according to one or more implementations may identify entities that are associated with entity-triggering queries. Thus, such a system may generate and output answers that are associated with these entities, thereby enhancing users' experiences by improving the ability of implementations to provide relevant and useful responses to users' questions.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 5 and 6 illustrate example data structures that may be stored by a document-entity association system, according to one or more implementations.

The same reference numbers in different drawings may identify the same or similar elements.

DETAILED DESCRIPTION

The following detailed description refers to the accompanying drawings.

Implementations described herein may enable one or more devices to identify entity-triggering queries. As further described herein, an entity-triggering query may include a query to which a response includes an entity identifier. Examples may include a name of an entity, such as a person, a business, a geographical location, a movie, a song, etc.; a physical address; a telephone number; an email address; a date; or any other type of information regarding an entity. The goal of such a query is to receive a response that provides the entity identifier for the relevant entity.

Additionally, or alternatively, an entity-triggering query may include a query to which a response includes information regarding an attribute of an entity. For example, attributes of a person entity may include information such as date of birth, e-mail address, telephone number, hair color, favorite movie, and/or any other information about the person. As another example, attributes of a business entity may include a physical address, a category, a telephone number, and/or any other information about the business. The goal of such a query is to be able to receive a response that provides information about the relevant attribute for the appropriate entity.

Figure 1A:
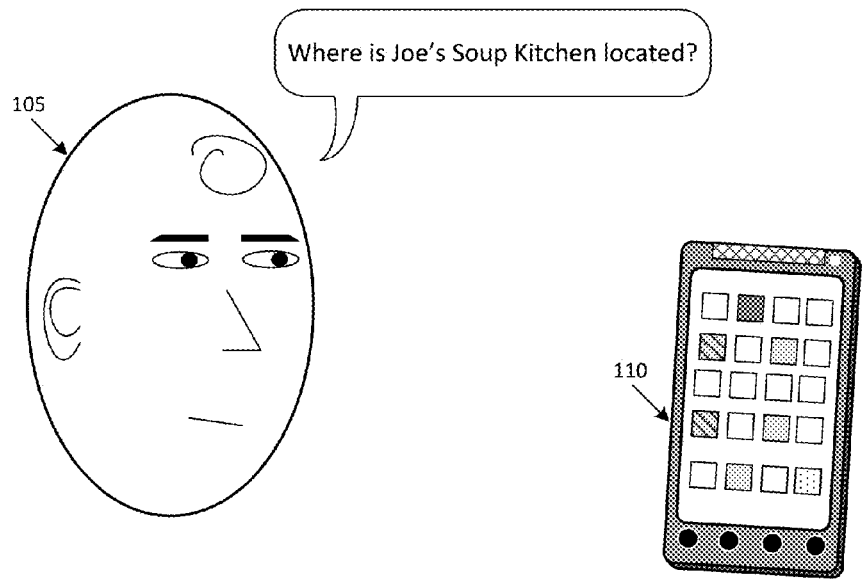
FIGS. 1A-1C illustrate an overview of example implementations described herein.
Figure 1B:
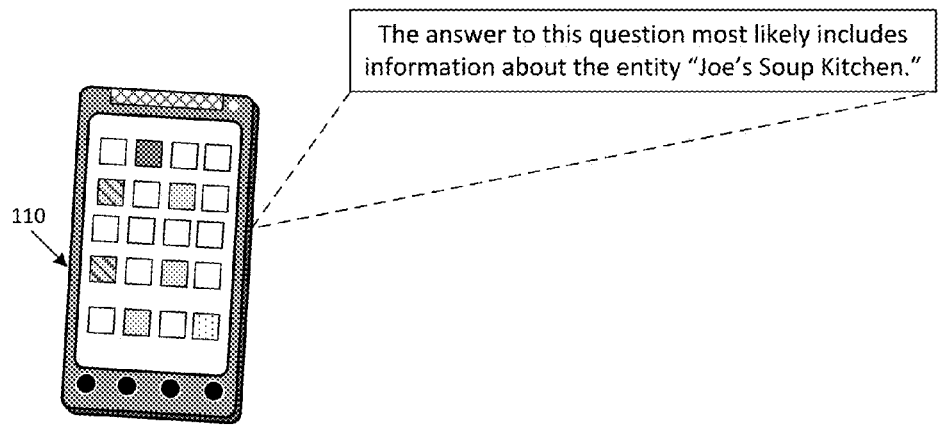
Figure 1C:
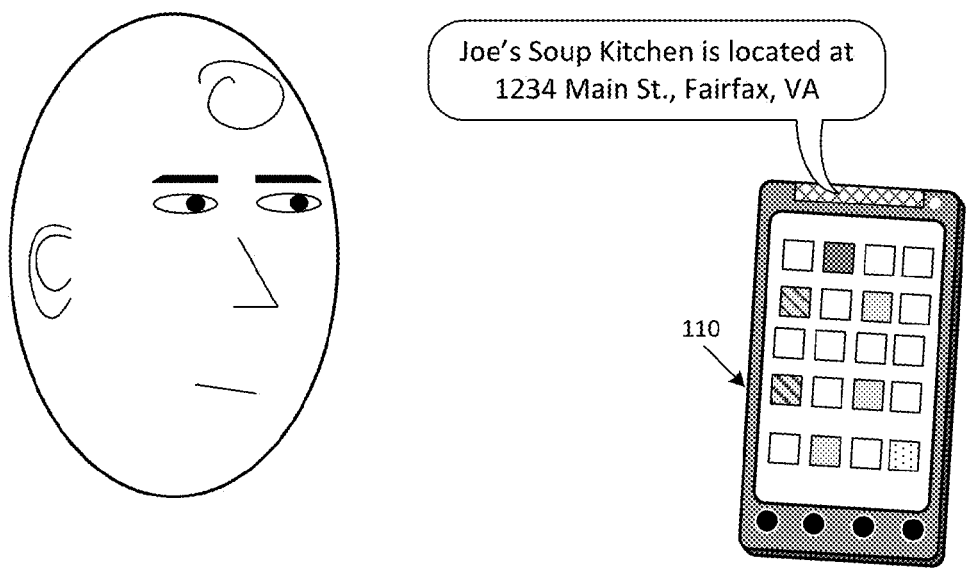

FIGS. 1A-1C illustrate an overview of example implementations described herein. For example, as shown in FIG. 1A, user 105 may ask a question, "Where is Joe's Soup Kitchen located?" to user device 110. As shown in FIG. 1B, user device 110, and/or any other device, may identify that an answer to the question "Where is Joe's Soup Kitchen located?" includes information associated with the entity "Joe's Soup Kitchen"—that is, that the question "Where is Joe's Soup Kitchen located?" is an entity-triggering query. More specifically, the goal of the query "Where is Joe's Soup Kitchen located?" is to determine the location attribute that is associated with the entity, "Joe's Soup Kitchen." In this example, "Joe's Soup Kitchen" is an example entity that is the name of a business establishment. The query is considered an entity-triggering query because what is necessary to resolve the query is to identify the entity that is relevant to the query, determine which type of information relevant to the entity is required, and then provide that information as an answer to the query.

Thus, in response, user device 110 may output a response that includes information about the entity "Joe's Soup Kitchen." For example, as shown in FIG. 1C, user device 110 may output information associated with the entity "Joe's Soup Kitchen." For instance, user device 110 may output the answer "Joe's Soup Kitchen is located at 1234 Main St., Fairfax, VA," which indicates a physical address associated with the entity "Joe's Soup Kitchen." This reply makes sense because the query used the terms "Where" and "located." By using these terms, it makes sense to provide the address of "Joe's Soup Kitchen" rather than other information, such as a phone number, that is not as responsive to the format of the query.

Figure 2:
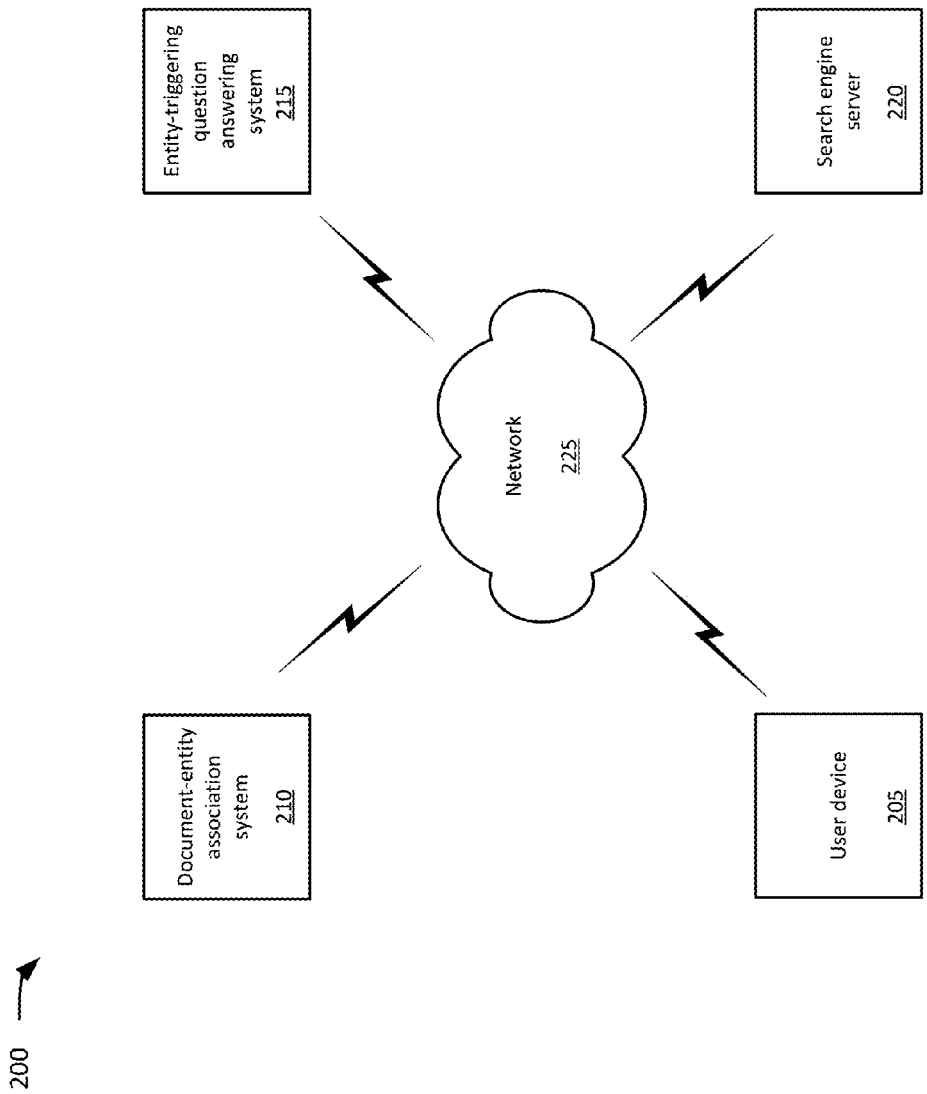
FIG. 2 illustrates an example environment in which systems and/or methods described herein may be implemented.

FIG. 2 is a diagram of an example environment 200 in which systems and/or methods described herein may be implemented. Environment 200 may include user device 205, document-entity association system 210, entity-triggering question answering system 215, and search engine server 220 connected to network 225. One user device 205 and three servers 210-220 have been illustrated as connected to network 225 for simplicity. In practice, environment 200 may include additional user devices and/or servers or fewer user devices and/or servers. Also, in some instances, a user device may perform a function of a server, or a server may perform a function of a user device. Additionally, while the implementation provided in FIG. 2 is illustrated as using a client-server network architecture, it may be noted that other architectures, such as peer-to-peer architectures may also be used to allow components of environment 200 to implement systems and methods.

User device 205 may implement one or more functions of user device 110, as illustrated in FIG. 1. User device 205 may include a client device, such as a mobile telephone, a personal computer, a personal digital assistant ("PDA"), a tablet computer, a laptop, or any other type of computation or communication device. While user device 205 may include a portable or mobile device, implementations exist in which user device 205 is not designed to be mobile, so long as user device 205 possesses the other functionality requisite to implement methods and systems. User device 205 may include audio input/output devices that allow a user to communicate with user device 205 via speech. For example, these audio input/output devices may include one or more microphones and/or one or more speakers. User device 205 may also include one or more visual input/output devices, such as one or more cameras and/or one or more display screens that are capable of presenting a user interface via which a user may interact. Additionally, user device 205 may also include other input/output devices, such as a keyboard, mouse, and so forth that allow user device 205 to receive commands from a user.

Some or all of servers 210-220 may each be implemented as a single server device or a collection of server devices that may be co-located or remotely located. Additionally, or alternatively, some or all of servers 210-220 may be implemented together within a single, common server device or a single, common collection of server devices. These servers provide the following functionality, in implementations.

Document-entity association system 210 may include one or more server devices. In some implementations, document-entity association system 210 may analyze documents and identify entities associated with the analyzed documents. A document may include, for example, a web site, a file, a combination of files, one or more files with embedded links to other files, a news group posting, a news article, a blog, a business listing, an electronic version of printed text, a web advertisement, an e-mail, etc. In the context of the Internet, a common document is a web page. Documents often include textual information and may include embedded information, such as metadata, images, hyperlinks, etc., and/or embedded instructions, such as Javascript, etc. Document-entity association system 210 provides information that relates the textual and embedded information contained in the document to specific entities. For example, a document might be a web page about the best pizza restaurants in Chicago. The textual information and embedded information might be used to derive information about the pizza restaurants as entities and store information related to those entities.

Document-entity association system 210 may additionally, or alternatively, store information associating entities with attributes. Examples of such information are described with respect to, for example, FIGS. 5 and 6. As also described further below, document-entity association system 210 may use this information, which associates entities with attributes, when identifying entities associated with documents.

Entity-triggering question answering system 215 may include one or more server devices. In some implementations, entity-triggering question answering system 215 may receive questions from user device 205, may identify questions that are entity-triggering questions, and may generate answers that include information associated with entities. As further described below, entity-triggering question answering system 215 may use information stored by document-entity association system 210 when generating answers that include information associated with entities.

Search engine server 220 may include one or more server devices. In some implementations, search engine server 220 may implement a search engine that receives queries, e.g., from client 205, document-entity association system 210, and/or from entity-triggering question answering system 215. The queries may be the result of voice recognition, but queries may also be received by other means. Search engine server 220 may provide one or more search results in response to the received queries. The search results may include information regarding one or more documents, such as a link to the one or more documents.

Additional servers, implementing other functions, may also be implemented in environment 200. For example, environment 200 may include a log server that stores information regarding input received from users by user device 205, a log server that stores information regarding output provided by user device 205, and/or any other server. In some implementations, users may opt into and/or opt out of services that allow the logging of input received and/or output by user device 205. The additional servers may additionally, or alternatively, provide, for example, web content, payment services, shopping services, social networking services, etc.

Network 225 may include any type of network, such as a local area network ("LAN"), a wide area network ("WAN"), a telephone network—e.g., the Public Switched Telephone Network ("PSTN") or a cellular network—an intranet, the Internet, or a combination of networks. User device 205, document-entity association system 210, entity-triggering question answering system 215, and/or search engine server 220 may connect to network 225 via wired and/or wireless connections. In other words, user device 205, document-entity association system 210, entity-triggering question answering system 215, and/or search engine server 220 may connect to network 225 via a wired connection, a wireless connection, or a combination of a wired connection and a wireless connection. Network 225 thus supports communication between user device 205, document-entity association system 210, entity-triggering question answering system 215, and/or search engine server 220 so that they may exchange information and perform their functions.

Figure 3:
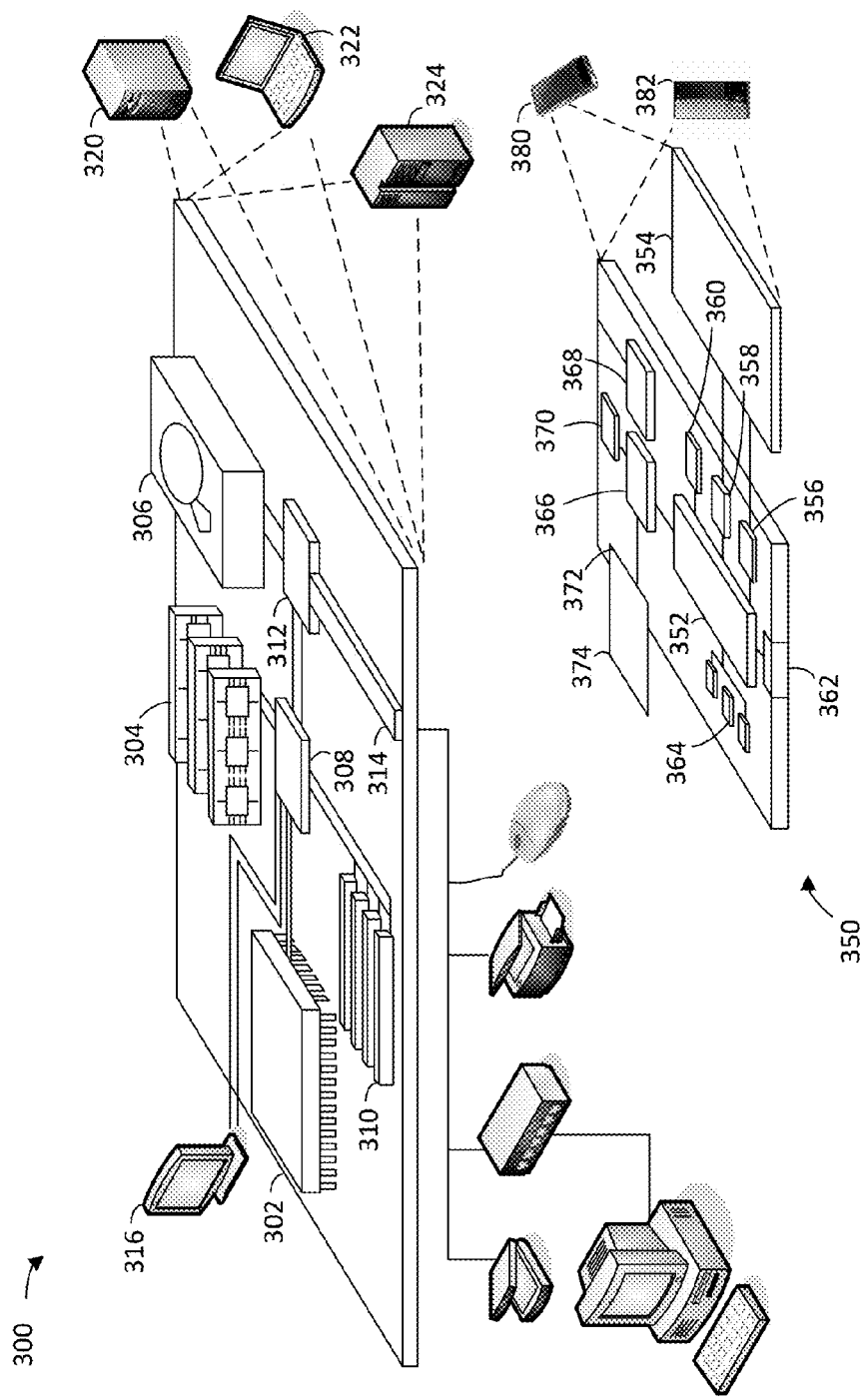
FIG. 3 illustrates an example of a generic computer device and a generic mobile computer device according to one or more implementations.

FIG. 3 shows an example of generic computing device 300 and generic mobile computing device 350, which may be used with the techniques described here. Computing device 300 and mobile computing device 350 may correspond to, for example, any of user device 205, document-entity association system 210, entity-triggering question answer system 215, and/or search engine server 220. Each of user device 205, document-entity association system 210, entity-triggering question answering system 215, and/or search engine server 220 may include one or more computing devices 300, mobile computing devices 350, or components of computing device 300 and/or mobile computing device 350.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smartphones, and other similar computing devices. The components shown in FIG. 3, their connections and relationships, and their functions, are meant to be examples only, and are not meant to limit implementations described and/or claimed in this document.

Computing device 300 may include a processor 302, memory 304, a storage device 306, a high-speed interface 308 connecting its components to memory 304 and high-speed expansion ports 310, and further connecting its components to a low speed interface 312 connected to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 stores information within the computing device 300. In some implementations, memory 304 includes a volatile memory unit or units. In some implementations, memory 304 includes a non-volatile memory unit or units. The memory 304 may also be another form of computer-readable medium, such as a magnetic or optical disk. A computer-readable medium may be defined as a non-transitory memory device. A memory device may include space within a single physical memory device or spread across multiple physical memory devices.

Storage device 306 is capable of providing mass, permanent storage for the computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In some implementations, high-speed controller 308 is coupled to memory 304, display 316, e.g., through a graphics processor or accelerator, and to high-speed expansion ports 310, which may accept various expansion cards that provide additional functionality to computing device 300. In this implementation, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a microdrive, flash memory, or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a Thin-Film-Transistor Liquid Crystal Display ("TFT LCD") or an Organic Light Emitting Diode ("OLED") display, or other appropriate display technology. Display interface 356 may include appropriate circuitry for driving display 354 to present graphical and other information to a user. Control interface 358 may receive commands from a user and convert them for submission to the processor 352. In addition, an external interface 362 may be in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a Single In Line Memory Module ("SIMM") card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, Global Positioning System ("GPS") receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed application specific integrated circuits ("ASICs"), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refer to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube ("CRT") or liquid crystal display ("LCD") monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
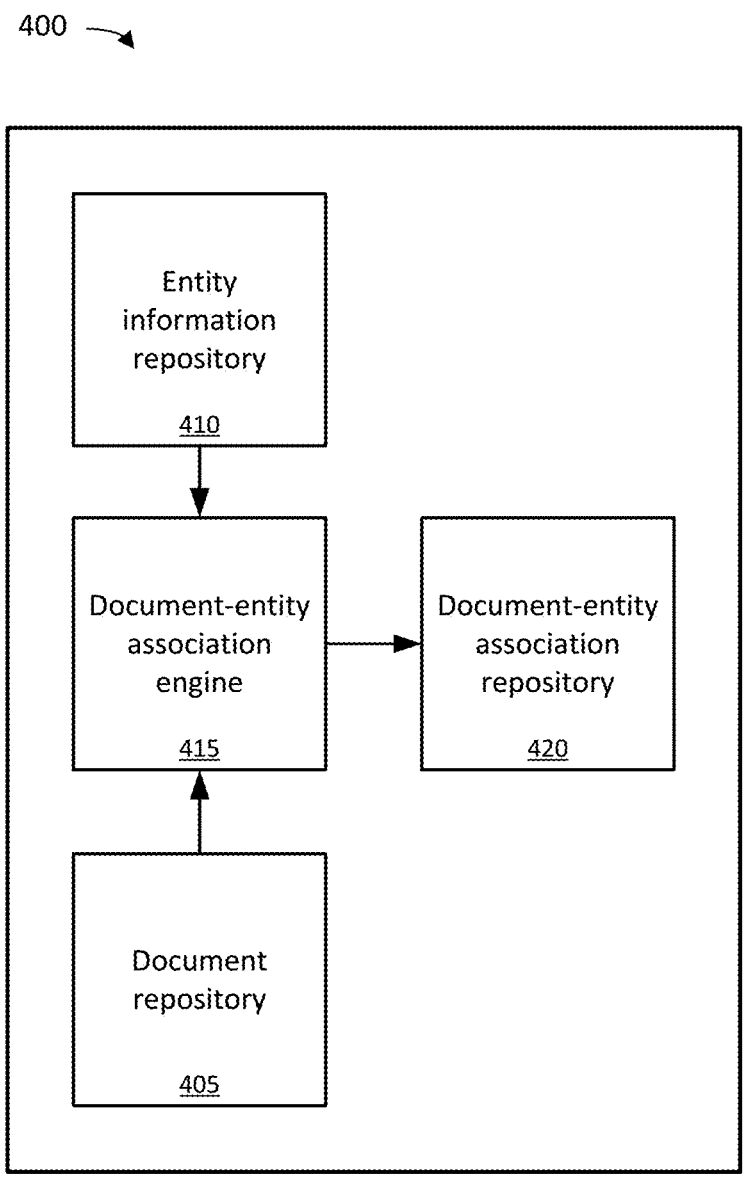
FIG. 4 illustrates example functional components of a document-entity association system, according to one or more implementations.

FIG. 4 illustrates example functional components of system 400.

System 400 may correspond to, for instance, some or all of the functional components of document-entity association system 210. As shown in FIG. 4, system 400 may include modules 405-420. In some implementations, system 400 may include fewer, additional, or different modules. Any, or all, of modules 405-420 may be implemented by one or more memory devices, such as memory 304 and/or memory 364, and/or one or more processors, such as processor 308 and/or processor 352. Furthermore, multiple modules may be associated with the same memory device and/or processor. For example, one memory device, or one set of memory devices, may store information associated with two or more of modules 405-420.

Document repository 405 may store information regarding a corpus of documents. For example, document repository 405 may store information indicating location identifiers of documents, such as Uniform Resource Locators ("URLs") and/or Uniform Resource Identifiers ("URIs"); content of documents; meta-data associated with documents; and/or any other information regarding documents. The topic of documents has been previously discussed with respect to FIG. 2.

Entity information repository 410 may store information regarding entities. An entity may include, for example, a person, a business, a geographical location, a movie, a song, a book, and/or any person, place, or object. An entity may be associated with an entity identifier, which may serve to identify the entity. For example, an entity identifier for a business entity may include the name of the business, an entity identifier for a person entity may include the name of the person, etc. In general, an entity is an identifiable thing that exists, but entities may be abstract things as well as physical things. An entity identifier is a name that provides a way of referring to an entity.

An entity may be associated with a set of attributes, which may each be associated with a set of values. In some implementations, entities of different types may be associated with different sets of attributes. For example, in some implementations, a person entity type may be associated with the following attributes: date of birth, e-mail address, and telephone number; while a business entity type may be associated with the following attributes: physical address, business category, and telephone number. Attributes are characteristics of entities that define the nature of the entity.

In some implementations, different entities of the same type may be associated with different sets of attributes. For example, one person entity may be associated with the following attributes: date of birth and e-mail address; while another person entity may be associated with the following attributes: eye color and hair color. Thus, attributes define the entities in ways that characterize and help differentiate the entities.

As mentioned above, attributes may be associated with values. For example, a date of birth attribute may be associated with the value "October 21, 1982," a hair color attribute may be associated with the value "black," a physical address attribute may be associated with the value "1234 Main St., Fairfax, VA 22030," etc. It may be noted that only certain values make sense for certain attributes. For example, while "brown" would be a reasonable value for hair color, "brown" would not make any sense as a phone number. Additionally, certain attributes may be interdependent. For example, only certain values of zip codes will be compatible with certain addresses. Further examples of information, which may be stored by entity information repository 410, are discussed below with respect to FIG. 5.

Entity information repository 410 may receive information regarding attributes from one or more of a variety of sources. For example, in some implementations, entity information repository 410 may receive information manually provided by users. In some implementations, entity information repository 410 may receive information from one or more devices that automatically identify entities, attributes, and/or attribute values. For example, entity information repository 410 may receive information from one or more devices that analyze documents and correlate terms in the documents—e.g., words and/or phrases—to entities.

As also mentioned above, users may opt in and/or opt out of services that collect information regarding users, such as various log files. In some implementations, users may be provided with an option to remove stored data associated with the users. In some such implementations, information stored by entity information repository 410, relating to a particular user, may be removed at the user's request. The ability to opt in and opt out of certain types of data tracking as well as the ability to remove personal data help protect user privacy.

Document-entity association engine 415 may analyze documents in order to identify entities associated with the documents. In some implementations, document-entity association engine 415 may receive information regarding documents from document repository 405 and information regarding entities from entity information repository 410 in order to analyze the documents. Document-entity association engine 415 may compare the information regarding the documents and the information regarding entities to identify entities associated with documents.

In some implementations, document-entity association engine 415 may identify terms in a particular document that match values associated with attributes of entities. For example, document-entity association engine 415 may identify that information regarding a particular document includes the phrase "1234 Main St., Fairfax, VA 22030." Further, document-entity association engine 415 may identify an entity that is associated with an attribute value of "1234 Main St., Fairfax, VA 22030." Document-entity association engine 415 may identify that the document is associated with the entity, based on identifying that terms in the document match an attribute value associated with the entity. Thus, document-entity association engine 415 compares information from document repository 405 and entity information repository 410 and by establishing relationships between the content of these two information sources, is able to derive associations between entities and documents with relevant content.

In some implementations, document-entity association engine 415 may identify terms in a particular document that match entity identifiers. For example, document-entity association engine 415 may identify that information regarding a particular document includes the phrase "Joe's Soup Kitchen." Further, document-entity association engine 415 may identify an entity that is associated with an entity identifier of "Joe's Soup Kitchen." Document-entity association engine 415 may identify that the document is associated with the entity, based on identifying that terms in the document match an entity identifier associated with the entity.

When determining whether terms in a document match an attribute value and/or an entity identifier, document-entity association engine 415 may determine whether the terms in the document exactly match the attribute value and/or the entity identifier. For example, document-entity association engine 415 may identify that information regarding a particular document includes the phrase "1234 Main St., Fairfax, VA 22030," and that document-entity association engine 415 may identify an entity that is associated with an attribute value of "1234 Main St., Fairfax, VA 22033." Document-entity association engine 415 may identify that the document is not associated with the entity, based on identifying that terms in the document do not exactly match an attribute value associated with the entity.

Additionally, or alternatively, when determining whether terms in a document match an attribute value and/or an entity identifier, document-entity association engine 415 may determine whether the terms in the document are similar to the attribute value and/or the entity identifier, beyond a similarity threshold. Document-entity association engine 415 may evaluate the similarity between terms in a document and attribute values and/or entity identifiers using any technique that indicates similarities of terms, such as edit distance, hamming distance, semantic similarity, evaluating whether one term is an abbreviation of another term, or any other technique of evaluating similarity. For example, document-entity association engine 415 may identify that information regarding a particular document includes the phrase "1234 Main St., Fairfax, VA 22030," and that document-entity association engine 415 may identify an entity that is associated with an attribute value of "1234 Main St., Fairfax, VA 22033." Document-entity association engine 415 may identify that the document is associated with the entity, based on identifying that terms in the document are similar to an attribute value associated with the entity.

Document-entity association engine 415 may output information associating documents with entities to, for example, document-entity association repository 420, which may store information associating documents with entities. A further example of information that may be stored by document-entity association repository 420 is described below with respect to FIG. 6. By storing document-entity associations, such as in document-entity association repository 420, this builds a set of information that may be used to reply to questions that involve entities.

As mentioned above, FIG. 5 illustrates an example data structure 500 that may be stored by en entity information repository, such as entity information repository 410. Data structure 500 may store information regarding one or more entities, along with associated attributes and values.

In some implementations, data structure 500 may include information regarding entity identifiers, such as the entity identifiers "Joe's Soup Kitchen," "Toyota," "Toyota Camry," "George Lucas," "Washington Redskins," etc. Data structure 500 may also include information regarding entity attributes and values. For example, for the example entity with the entity identifier "Joe's Soup Kitchen," data structure 500 may store information identifying the following attributes and one or more values associated with each of the attributes: the attribute "Address" associated with the value "1234 Main St., Fairfax, VA 22030," the attribute "Website URL" associated with the value "www.joessoupkitchen.biz," the attribute "Category" associated with the value "Restaurant," the attribute "Sub-category" associated with the value "Soup restaurant," the attribute "Keywords" associated with the values "Soup, food, eating," etc.

Figure 5:
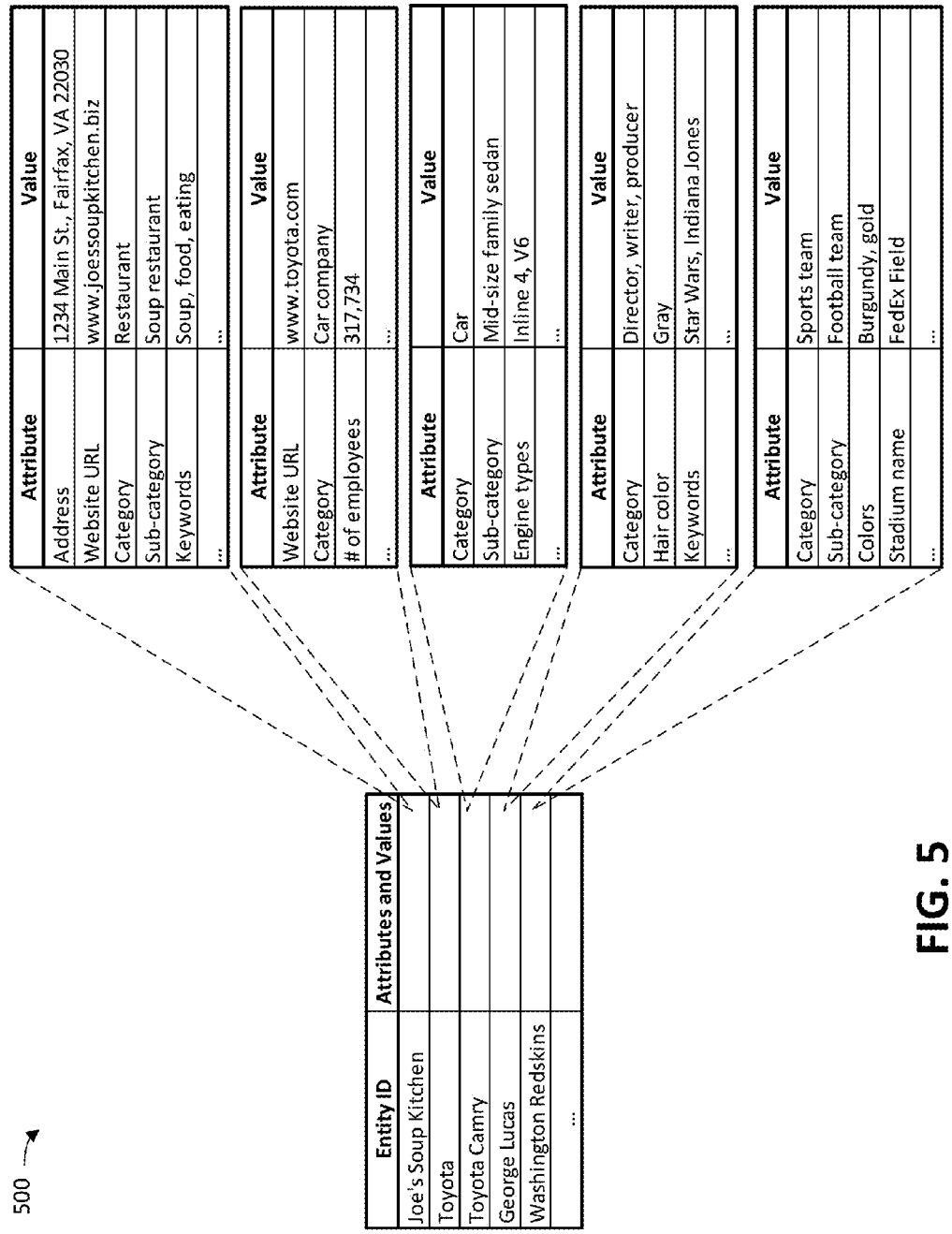

As also shown in FIG. 5, data structure 500 may store information associated with other example entities. The other example entities may be associated with one or more same attributes and/or one or more different attributes than the example attributes described above with respect to the entity identifier "Joe's Soup Kitchen." For example, another example entity may be associated with the entity identifier "Toyota," and the attributes "Website URL," "Category," and "Number of employees."

Thus, FIG. 5 shows a table of entities, with each entity being stored under an entity ID, and with each entity being associated with another table that includes attributes associated with values. However, FIG. 5 is only one way of recording information about entities and their associated attributes, and other organizational schemes may be employed.

FIG. 6 illustrates an example data structure 600 that may be stored by a document-entity association repository, such as document-entity association repository 420. The information stored in data structure 600 may indicate one or more entities that are associated with one or more documents. For example, a document with a document identifier of "D1" may be associated with the entity "Joe's Soup Kitchen," a document with a document identifier of "D2" may be associated with the entities "George Lucas" and "Star Wars," a document with a document identifier of "D3" may be associated with the entities "Washington Redskins" and "Toyota," etc. In some implementations, a document identifier may include a location identifier associated with a document, such as a URL and/or a URI. In some implementations, a document identifier may include any other information that may be used to identify a document.

While data structures 500 and 600 are represented in FIGS. 5 and 6, respectively, as including tables with rows and columns, in practice, data structures 500 and 600 may include any type of data structure, such as a linked list, a tree, a hash table, a database, or any other type of data structure. Data structures 500 and/or 600 may include information generated by and/or received from one or more devices, such as one or more functional components described above with respect to FIG. 4. Additionally, or alternatively, data structures 500 and/or 600 may include information provided from any other source, such as information provided by one or more users, and/or information automatically provided by one or more other devices. Furthermore, in some implementations, one or more of data structures 500 and/or 600 may include additional, different, or less information than the information shown in FIGS. 5 and 6. For example, data structure may include information identifying entity types.

Figure 7:
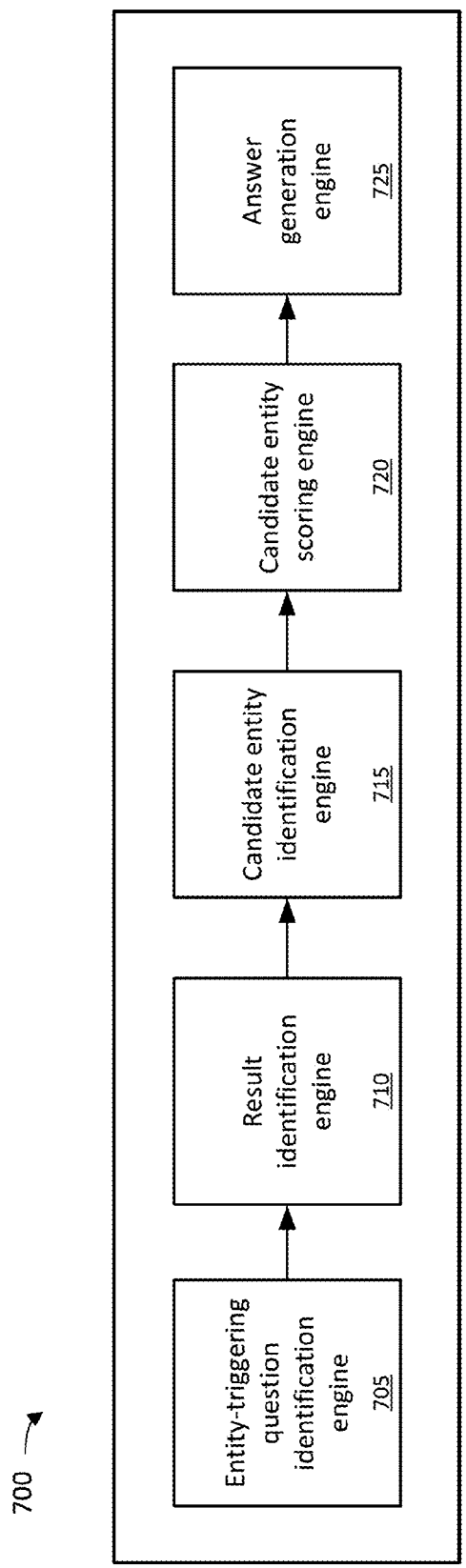
FIG. 7 illustrates example functional components of an entity-triggering question answering system answer system, according to one or more implementations.

FIG. 7 illustrates example functional components of system 700. System 700 may correspond to, for instance, some or all of the functional components of entity-triggering question answer system 215. As shown in FIG. 7, system 700 may include modules 705-725. In some implementations, system 700 may include fewer, additional, or different modules. Any, or all, of modules 705-725 may be implemented by one or more memory devices, such as memory 304 and/or memory 364, and/or one or more processors, such as processor 308 and/or processor 352. Furthermore, multiple modules may be associated with the same memory device and/or processor. For example, one memory device, or one set of memory devices, may store information associated with two or more of modules 705-725.

Entity-triggering question identification engine 705 may receive a question, and may identify whether the question is an entity-triggering question. Entity-triggering question identification engine 705 may receive a question from, for example, a user device, such as user device 205. In some implementations, entity-triggering question identification engine 705 may analyze terms of the question to identify whether the question is not an entity-triggering question. For example, entity-triggering question identification engine 705 may compare terms of the question to a list of terms that indicate questions that are entity-triggering questions, such as, for example, "who," "which," "where," "how tall," and/or other terms. These terms may be indicative of questions to which the answer includes an entity identifier and/or an attribute value associated with an entity. Entity-triggering question identification engine 705 may identify that questions that include terms from the list of filtered terms are not entity-triggering questions, and, in some implementations, entity-triggering question identification engine 705 may identify that questions that do not include terms from the list of filtered terms are entity-triggering questions.

Additionally, or alternatively, entity-triggering question identification engine 705 may compare terms of the question to a list of filtered terms that indicate questions that are not entity-triggering questions, such as, for example, "what," "tell me about," "why," "how does," "can you explain," and/or other terms. These terms may be indicative of questions to which the answer includes a lengthy explanation and/or does not include an entity identifier and/or an attribute value associated with an entity. Entity-triggering question identification engine 705 may identify that questions that include terms from the list of filtered terms are not entity-triggering questions, and, in some implementations, entity-triggering question identification engine 705 may identify that questions that do not include terms from the list of filtered terms are entity-triggering questions.

When determining whether a question includes a particular term from a list of terms, in some implementations, entity-triggering question identification engine 705 may determine whether a term of the question exactly matches the particular term from the list of terms. In some implementations, entity-triggering question identification engine 705 may determine whether a term of the question is similar to the particular term from the list of terms, beyond a particular similarity threshold. In some implementations, entity-triggering question identification engine 705 may determine whether a term of the question is an abbreviated version of the particular term from the list of terms, and/or whether the particular term from the list of terms is an abbreviated version of the term of the question.

Entity-triggering question identification engine 705 may use any other technique in addition to, or in lieu of, the above examples in order to determine whether a question is an entity-triggering question. For example, entity-triggering question identification engine 705 may use semantic analysis to determine whether the question is an entity-triggering question.

Result identification engine 710 may identify documents based on entity-triggering questions. For example, result identification engine 710 may form search queries based on entity-triggering questions, and provide the search queries to a search engine, such as search engine server 220. Result identification engine 710 may receive one or more search results that are responsive to the search queries. The search results for a particular search query may include information regarding documents that were identified based on the particular search query. The information may include, for example, content of the documents and/or location identifiers of the documents. The information for a particular search result may further include, for example, a snippet extracted from the particular search result. A snippet extracted from a particular search result may include, for example, a portion of text extracted from content of a document associated with the search result.

Candidate entity identification engine 715 may identify entities associated with search results, such as the search results identified by candidate entity identification engine 715 by, for example, identifying information stored in a document-entity association repository, such as document-entity association repository 420. In some implementations, candidate entity identification engine 715 may identify entities associated with all of the search results identified by result identification engine 710. Candidate entity identification engine 715 may, for example, identify entities associated with search result documents based on document identifiers of the search result documents.

In some implementations, candidate entity identification engine 715 may identify entities associated with fewer than all of the search results identified by result identification engine 710. For example, candidate entity identification engine 715 may identify entities associated with up to a particular maximum quantity of search results, such as 5 search results, 10 search results, 100 search results, etc.

In some implementations, the search results may be associated with result scores that indicate strength of the search results. These result scores may be based on one or more of a variety of factors, such as relevance to the search query, quantity of links to and/or from a document associated with the search result, an age of a document associated with the search result, an amount of traffic to and/or from the document, and/or any other factor. In some implementations, candidate entity identification engine 715 may identify entities associated with search results that are associated with a result score that is above a threshold. In some implementations, candidate entity identification engine 715 may identify entities associated with search results, independent of result scores.

Candidate entity identification engine 715 may identify entities that are identified as being associated with the search results that match one or more terms of the search query. In a use case, the search query may include the phrase "Where is Joe's Soup Kitchen located?" In this use case, a particular search result may be a document that is associated with an entity with the entity identifier "Joe's Soup Kitchen." Candidate entity identification engine 715 may identify that the entity with the entity identifier "Joe's Soup Kitchen" is associated with the query.

In some implementations, candidate entity identification engine 715 may identify whether terms in the search query exactly match some or all of an entity identifier. In some implementations, candidate entity identification engine 715 may use one or more similarity detection techniques to identify whether terms in the search query are similar to an entity identifier, beyond a similarity threshold. In some implementations, candidate entity identification engine 715 may exclude insignificant words, such as stop words, from an entity identifier and/or from the search query when identifying whether terms in the search query match an entity identifier.

In some implementations, candidate entity identification engine 715 may identify whether terms in the search query match terms in an attribute value associated with an entity. Identifying a match may include either an exact match or a sufficient degree of similarity. For example, a particular search query may include the phrase "Which football team wears the colors burgundy and gold?" Referring to the example data shown in FIG. 5, candidate entity identification engine 715 may identify that the terms "burgundy" and "gold" match values associated with a "colors" attribute of the entity "Washington Redskins."

Candidate entity scoring engine 720 may generate or modify entity confidence scores for one or more entities identified by candidate entity identification engine 715. For instance, in some implementations, candidate entity scoring engine 720 may generate or modify entity confidence scores for entities before the entities are identified by candidate entity identification engine 715—e.g., via an "offline" or a "pre-computing" process. Candidate entity scoring engine 720 may generate or modify these entity confidence scores based on one or more of a variety of factors. For example, candidate entity scoring engine 720 may generate or modify an entity confidence for a particular entity based on a quantity of search results in which the entity was identified.

Additionally, or alternatively, candidate entity scoring engine 720 may generate or modify an entity confidence score for a particular entity based on a proportion of search results, out of a set of analyzed search results, in which the particular entity was identified. For example, candidate entity identification engine 715 may analyze 10 search results, and identify that the particular entity is associated with 7 of the 10 search results. Candidate entity scoring engine 720 may generate or modify an entity confidence score for the particular entity based on the proportion—i.e., 0.7—of analyzed search results in which the particular entity was identified.

Additionally, or alternatively, candidate entity scoring engine 720 may analyze snippets associated with search results, and generate or modify entity confidence scores based on identifying entity identifiers in the snippets. For example, that candidate entity scoring engine 720 may receive information from candidate entity identification engine 715, indicating that an entity that has an entity identifier of "Joe's Soup Kitchen" was identified as being associated with a particular search result. Further, candidate entity scoring engine 720 may identify that a snippet—associated with the particular search result and/or another search result—matches the entity identifier "Joe's Soup Kitchen." Candidate entity scoring engine 720 may generate or modify—e.g., increase—an entity confidence score for the entity having the entity identifier "Joe's Soup Kitchen" based on identifying that the snippet matches the entity identifier.

Additionally, or alternatively, candidate entity scoring engine 720 may generate or modify an entity confidence score for a particular entity based on a result score that is associated with a search result in which the particular entity was identified. For example, candidate entity identification engine 715 may identify that a first entity is associated with two search results, having the result scores 0.7 and 0.8. Further, candidate entity identification engine 715 may identify that a second entity is associated with two search results, having the result scores 0.7 and 0.9. Candidate entity scoring engine 720 may, for example, generate an entity confidence score for the second entity that is higher than an entity confidence score for the first entity, based on the second entity being associated with a search result that has a higher result score.

Additionally, or alternatively, candidate entity scoring engine 720 may generate or modify an entity confidence score for a particular entity based on a quantity of times that an entity identifier appears in a particular search result. For example, candidate entity identification engine 715 may identify that the particular entity appears four times in the content of a document associated with the particular search result. Candidate entity scoring engine 720 may generate or modify an entity confidence score for the particular entity based on identifying that the particular entity appears four times in the content of a document associated with the particular search result. For example, candidate entity scoring engine 720 may increase the entity confidence score based on identifying that the particular entity appears four times in the content of a document associated with the particular search result.

Additionally, or alternatively, candidate entity scoring engine 720 may generate or modify an entity confidence score for a particular entity based on whether the particular entity, for example, as identified by an entity identifier for the particular entity, matches one or more terms of an entity-triggering question. For example, candidate entity identification engine 715 may identify that the entity identifier for the particular entity is "Joe's Soup Kitchen," and that the question includes the terms "Joe's Soup Kitchen." Candidate entity scoring engine 720 may generate or modify an entity confidence score for the particular entity based on identifying that the entity identifier for the particular entity matches one or more terms of the question. For example, candidate entity scoring engine 720 may decrease the entity confidence score based on identifying that the entity identifier for the particular entity matches one or more terms of the question.

In some implementations, if an entity identifier appears in a particular search result greater than a particular quantity of times, candidate entity scoring engine 720 may detect that the particular search result is spam, and may generate or modify an entity confidence score for the particular entity accordingly. For example, in some implementations, candidate entity scoring engine 720 may ignore the particular search result when generating or modifying the entity confidence score for the particular entity. In some instances, candidate entity scoring engine 720 may ignore occurrences of the entity identifier in the particular search result that are beyond a particular maximum quantity of occurrences of the entity identifier. For example, the maximum quantity of occurrences may be 3, and the entity identifier may occur 7 times in the content of a document associated with the particular search result. Candidate entity scoring engine 720 may generate or modify an entity confidence score for the entity based on 3 occurrences of the entity in the particular document, instead of 7 occurrences. In some implementations, candidate entity scoring engine 720 may generate or modify an entity confidence score using one of the above techniques, a combination of the above techniques, and/or any other technique.

Candidate entity scoring engine 720 may, in some implementations, rank the entities based on the generated or modified entity scores. Answer generation engine 725 may select a particular entity based on the entity confidence scores generated or modified by candidate entity scoring engine 720, and/or the ranking performed by candidate entity scoring engine 720.

Answer generation engine 725 may generate an answer based on the selected entity. In some implementations, answer generation engine 725 may compare the entity-triggering question, identified by entity-triggering question identification engine 705, to attributes associated with the particular entity. For example, the entity-triggering question may include the phrase "Where is Joe's Soup Kitchen located?", and that the entity selected by answer generation engine 725 may be "Joe's Soup Kitchen." Answer generation engine 725 may identify that the question is requesting a value of a location attribute of the entity "Joe's Soup Kitchen." In order to identify which attribute of the entity is being requested by the question, answer generation engine 725 may analyze some or all of the terms of the question. In some implementations, when performing this analysis, answer generation engine 725 may exclude terms of the question that are associated with the entity—e.g., "Joe's Soup Kitchen." In some implementations, answer generation engine 725 may perform an analysis, such as a semantic analysis, to determine that, for example, the terms "where" and "located" are associated with a location, such as a physical address.

Answer generation engine 725 may compare terms of the question to types of attributes associated with the selected entity. For example, referring to the example data associated with the "Joe's Soup Kitchen" entity, shown in FIG. 5, answer generation engine 725 may determine that the terms "where" and/or "located" are associated with the "address" attribute of the entity, which is associated with a value of "1234 Main St., Fairfax, VA 22030." In some implementations, answer generation engine 725 may generate an answer that includes the phrase "1234 Main St., Fairfax, VA 22030."

Additionally, or alternatively, answer generation engine 725 may analyze snippets, associated with search results identified by result identification engine 710, and select a particular snippet as an answer. For example, answer generation engine 725 may generate or modify snippet confidence scores for snippets based on comparing terms in the snippets to terms in the identified attribute value. In some implementations, when generating snippet confidence scores, answer generation engine 725 may identify terms in snippets that exactly match and/or are similar to terms in the identified attribute value. In some implementations, answer generation engine 725 may generate or modify snippet confidence scores based on a result rank associated with a search result with which a snippet is associated.

Continuing with the above example, a particular snippet, for a search result that is associated with a relatively high result score, may include the phrase, "Joe's has been serving soup for 69 years, and is located at 1234 Main St., Fairfax, VA." Answer generation engine 725 may select the particular snippet as an answer to the question based on the snippet matching a portion of the identified attribute value, and/or based on the relatively high result score associated with the search result.

In some implementations, answer generation engine 725 may generate a search result presentation document that includes information identifying some or all of the search results identified by result identification engine 710. The search result presentation document may include, for example, links to documents associated with the search results, snippets associated with the search results, etc. In some implementations, the search result presentation document, generated by answer generation engine 725, may include a display area that includes the answer generated by answer generation engine 725, for example, at or near the top of the search result presentation document, above information regarding search results, and/or at another place in the search result presentation document.

In some implementations, the search result presentation document, generated by answer generation engine 725, may include different formatting—e.g., bold typeface, highlighting, larger typeface, different font, and/or other formatting that is different from information regarding other search results—for portions or entire search results that fully or partially match the generated answer and/or the identified attribute value. Continuing with the above example, the search result presentation document may include the snippet that was selected as the answer—"Joe's has been serving soup for 69 years, and is located at 1234 Main St., Fairfax, VA." In some implementations, the search result presentation document may include different formatting—e.g., bold typeface—for the entire selected snippet.

In some implementations, the search result presentation document may include different formatting for the portion of the snippet that matches the attribute value, but not for the rest of the snippet. That is, the snippet may include, for example, non-bold typeface for "Joe's has been serving soup for 69 years, and is located at," and may include bold typeface for "1234 Main St., Fairfax, VA."

In some implementations, the search result presentation document may include different formatting for terms in the snippet that match terms that are associated with the attribute type. Continuing with the above example, the attribute type is "address." Answer generation engine 725 may identify that the terms "located at," in the above example snippet, are associated with the "address" attribute type. In some such implementations, the words "located at" may be presented with bold typeface in addition to, or in lieu of, other words in the snippet being presented with bold typeface.

In some implementations, answer generation engine 725 may output information regarding the selected particular entity and/or the selected snippet to one or more server devices, such as a server device that receives and ranks answers from various sources, a question-answer log server device, and/or any other server device. In some implementations, answer generation 725 may output information regarding multiple entities—e.g., a particular quantity of entities with highest entity confidence scores—and/or multiple snippets—e.g., a particular quantity of snippets with highest snippet confidence scores.

While one example of a possible entity-triggering question was described above with respect to FIG. 7, in practice, other entity-triggering questions are possible. For example, entity-triggering question identification engine 705 may receive the question "Which football team wears the colors burgundy and gold?" Entity-triggering question identification engine 705 may identify that the question is an entity-triggering question based on, for example, the fact that the question includes the word "which." Result identification engine 710 may identify a set of search results associated with the question, and candidate entity identification engine 715 may identify entities, associated with the set of search results, that are associated with the question. For example, candidate entity identification engine 715 may identify that the entity "Washington Redskins" is associated with the question based on identifying that the attribute values "burgundy" and "gold," associated with the entity "Washington Redskins," match terms of the question. Candidate entity scoring engine 720 may generate entity confidence scores for the entities based on one or more factors described above, such as result scores associated with search results with which entities are associated, a quantity of search results with which entities are associated, etc. Answer generation engine 725 may select an entity based on the entity confidence scores.

For example, answer generation engine 725 may identify that the entity "Washington Redskins" is associated with a highest entity confidence score, and may generate an answer based on the selected entity, as described above. Answer generation engine 725 may identify that the answer includes an entity identifier, as opposed to a value associated with an entity attribute based on, for example, identifying that the question matches the entity identifier.

Figure 8:
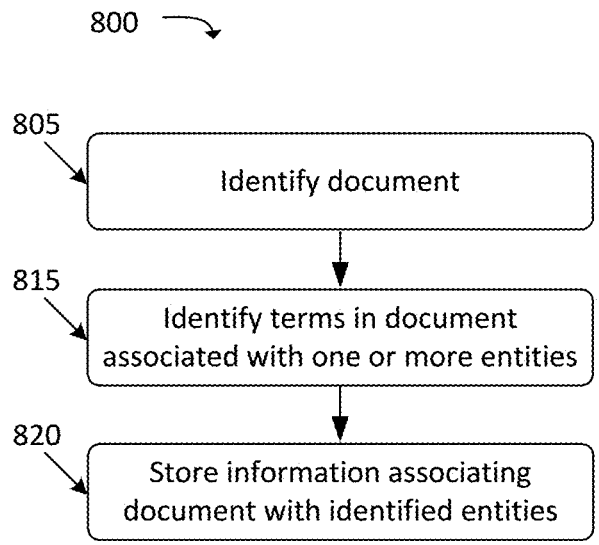
FIG. 8 illustrates a flowchart of an example process for storing information associating documents with entities, according to one or more implementations described herein.

FIG. 8 illustrates a flowchart of an example process 800 for storing information associating documents with entities. In some implementations, process 800 may be performed by document-entity association system 210. In some implementations, process 800 may be performed by one or more other components instead of, or possibly in conjunction with, document-entity association system 210.

Process 800 may include identifying a document (block 805). For example, as described above with respect to document-entity association engine 415, document-entity association system 210 may identify a document for which information is stored in a repository, such as document repository 405.

Process 800 may also include identifying terms in the document that are associated with one or more entities (block 810). For example, as described above with respect to document-entity association engine 415, document-entity association system 210 may identify terms in the document that match—e.g., are identical to or are similar to—terms associated with entities. In order to perform this identification, document-entity association system 210 may compare terms of the document to terms, associated with entities that are stored by a repository, such as entity information repository 410.

For example, referring to the example data shown in FIG. 5, document-entity association system 210 may identify that a particular document that is associated with the term "www.joessoupkitchen.biz." Document-entity association system 210 may identify that "www.joessoupkitchen.biz" is associated with the entity "Joe's Soup Kitchen." Document-entity association system 210 may thus identify that the particular document is associated with the entity "Joe's Soup Kitchen."

Process 800 may further include storing information associating the document with the identified one or more entities (block 815). For example, as described above with respect to document-entity association repository 420, document-entity association system 210 may store information associating the document with the entities identified at block 810. Continuing with the above example, document-entity association system 210 may store information identifying that the particular document is associated with the entity "Joe's Soup Kitchen."

Figure 9:
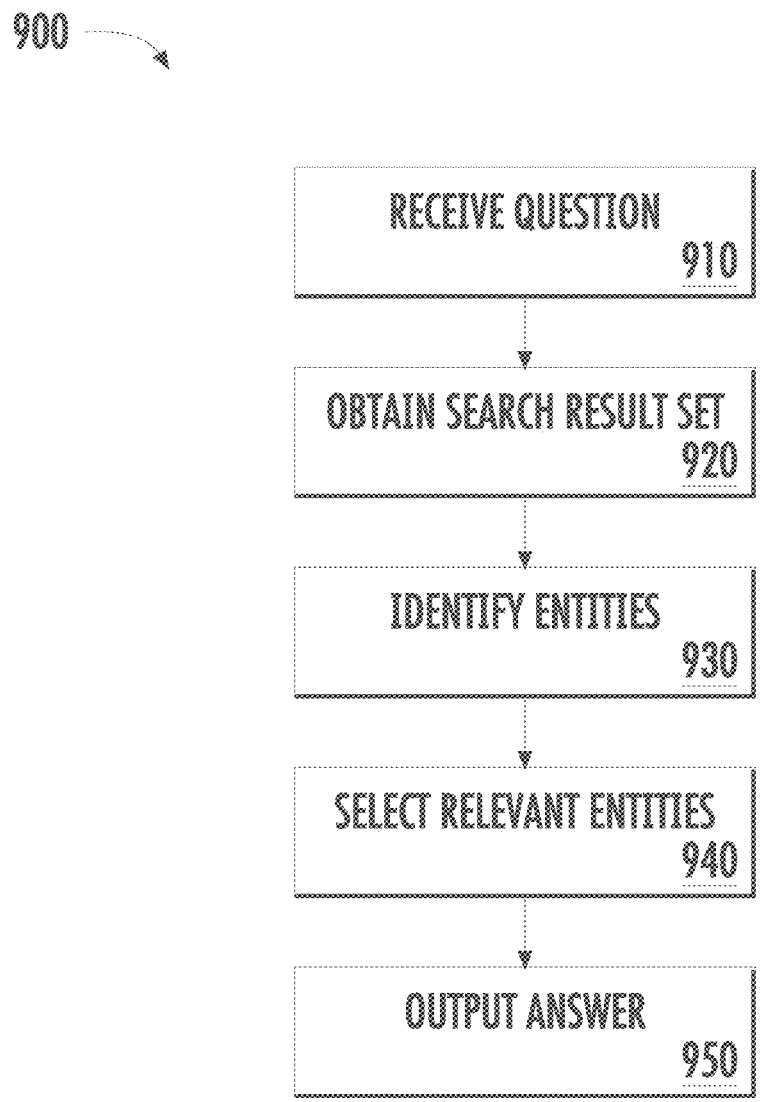
FIG. 9 illustrates a flowchart of an example process for answering entity-triggering questions, according to one or more implementations described herein.

FIG. 9 illustrates a flowchart of an example process 900 for answering entity-triggering questions. In some implementations, process 900 may be performed by entity-triggering question answering system 215. In some implementations, process 900 may be performed by one or more other components instead of, or possibly in conjunction with, entity-triggering question answering system 215.

Process 900 may include receiving a question at a computing device (block 910). For example, as described above with respect to entity-triggering question identification engine 705, entity-triggering question answering system 215 may receive a question from a user device, such as user device 205. The question may be received at the user device via voice input, text input, and/or any other input technique.

Process 900 may further include obtaining a search result set based on the question (block 920). For example, as described above with respect to result identification engine 710, entity-triggering question answering system 215 may identify a set of search results based on the entity-triggering question. Entity-triggering question answering system 215 may receive information regarding the search results from a search engine server, such as search engine server 220. As also mentioned above, this information may include, for example, links to documents associated with search results, snippets extracted from documents associated with search results, and or any other information associated with search results.

Process 900 may additionally include identifying one or more entities that are associated with at least one document referenced by the search result set (block 930). For example, as described above with respect to candidate entity identification engine 715, entity-triggering question answering system 215 may identify entities, associated with search results obtained at block 920. As described above, entity-triggering question answering system 215 may, for example, compare terms in entity identifiers of entities associated with search results to terms associated with the question received at block 910. Continuing with the above example, entity-triggering question answering system 215 may identify a particular search result that is associated with the entity "Joe's Soup Kitchen." Entity-triggering question answering system 215 may identify that this entity is associated with the question received at block 910, since terms of the entity identifier for the entity match terms of the question.

Process 900 may further include selecting one or more relevant entities identified as being associated with (i) documents referenced by the search result set and (ii) the question (block 940). For example, as described above with respect to answer generation engine 725, entity-triggering question answering system 215 may select an entity that are associated with (i) documents referenced by the search result set and (ii) the question. One way in which this may be done is based on entity scores, as discussed above. Continuing with the above example, an entity score for the entity "Joe's Soup Kitchen" may be a highest entity score out of a set of entity scores associated with the identified entities. Entity-triggering question answering system 215 may select the entity based on "Joe's Soup Kitchen" being associated with a highest entity score.

Process 900 may additionally include outputting an answer to the question based at least on the selected one or more entities (block 950). For example, as described above with respect to answer generation engine 725, entity-triggering question answering system 215 may generate an answer that is based on the selected entity or entities. Entity-triggering question answering system 215 may, for instance, identify an attribute associated with the selected entity or entities based on terms in the question received at block 910. Continuing with the above example, entity-triggering question answering system 215 may identify, for example, that the question includes the word "where" and/or the word "located." Entity-triggering question answering system 215 may identify that the question relates to with an "address" attribute associated with the selected entity. Entity-triggering question answering system 215 may generate an answer that includes attribute information associated with the address. Once the answer has been generated, it may subsequently be output, as will be discussed now.

In some implementations, as described above, when generating the answer, entity-triggering question answering system 215 may generate a search result presentation document that includes an identification of the answer. In some implementations, the generated search result presentation document may include a display area that includes some or all of the answer.

The search result presentation document may, in some implementations, also include information regarding search results that were identified based on the question. These search results may include snippets that are extracted from documents associated with the search results. As mentioned above, in some implementations, entity-triggering question answering system 215 may identify snippets, or portions of snippets that are associated with the identified attribute value and may present these snippets, or portions of snippets, more prominently than other snippets that are not associated with the identified attribute value. For example, these identified snippets, or portions of snippets, may be presented with a bold typeface, while other snippets may not be. As also mentioned above, entity-triggering question answering system 215 may, in some implementations, select a particular snippet as an answer.

For example, as described above with respect to answer generation engine 725, entity-triggering question answering system 215 may output the generated answer to a user device, such as user device 205. Entity-triggering question answering system 215 may, in some implementations, output a generated search result presentation document. Additionally, or alternatively, entity-triggering question answering system 215 may output a portion or all of the identified attribute value. Additionally, or alternatively, entity-triggering question answering system 215 may output a portion or all of a selected snippet. User device 205 may present the answer via, for example, an audio output, a video output, and/or using any other technique. In some implementations, as also mentioned above, entity-triggering question answering system 215 may output information identifying the selected entity, the selected snippet, multiple entities, and/or multiple snippets to one or more server devices.

FIGS. 10 and 11A-11C illustrate example search result presentation documents 1000, 1100, 1110, and 1120 respectively. Search result presentation documents 1000, 1100, 1110, and 1120 may correspond to examples of search result presentation documents that may be generated by, for example, entity-triggering question answering system 215, as discussed above with respect to block 935. Search result presentation documents 1000, 1100, 1110, and 1120 may include information regarding search results that are responsive to an entity-triggering question, such as "Where is Joe's Soup Kitchen Located?" As shown in FIGS. 10 and 11A-11C, search result presentation documents 1000, 1100, 1110, and 1120 may further include information regarding an answer that is based on the question.

Figure 10:
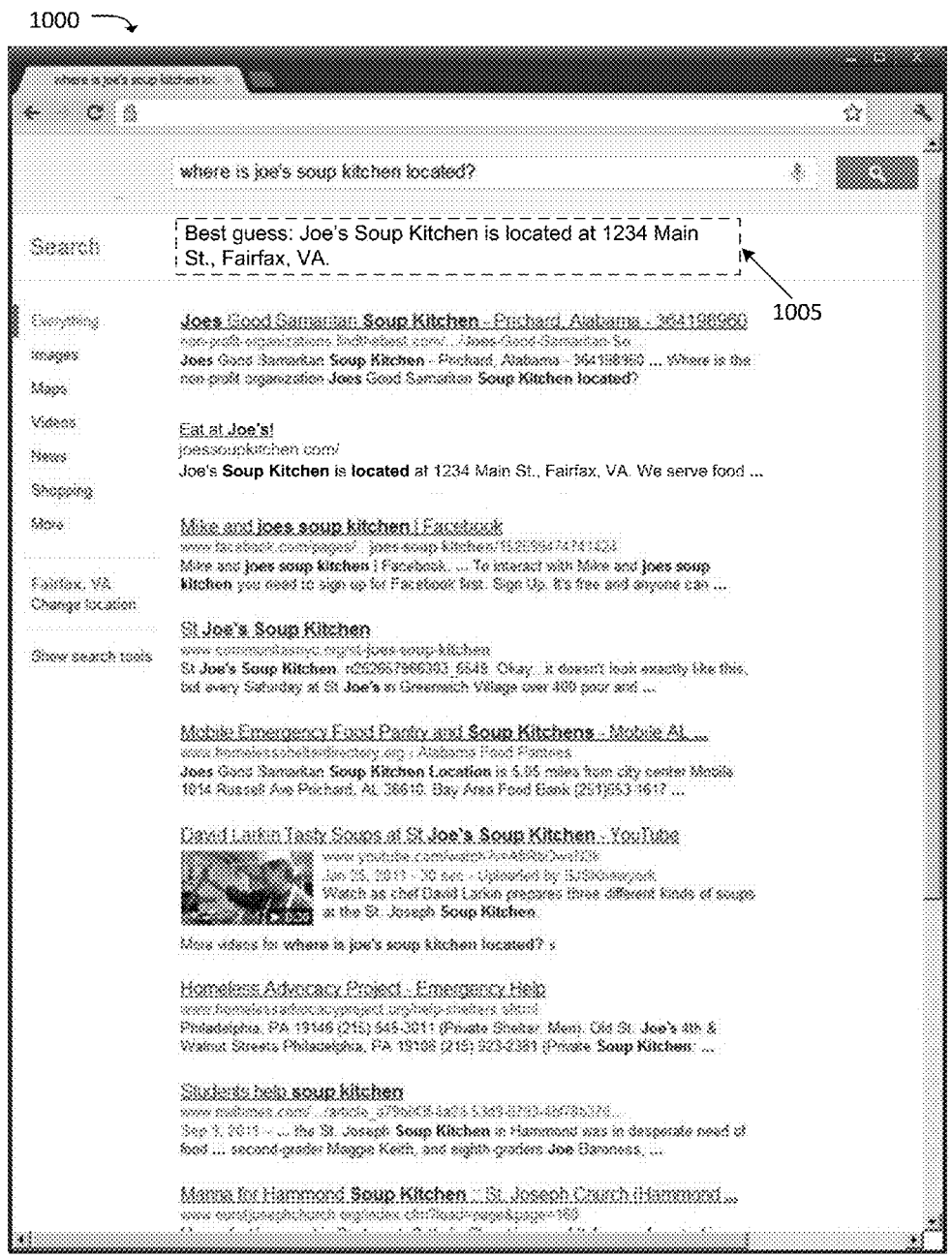
FIGS. 10 and 11A-11C illustrate example documents, according to one or more implementations described herein.

As shown in FIG. 10, search result presentation document 1000 may include display area 1005, which may include an answer associated with the question. Display area 1005 may be displayed more prominently than other information in the document, such as the information regarding the search results. For example, display area 1005 may be visually presented above information regarding the search results, may include a different typeface than information regarding the search results, etc.

Figure 11A:
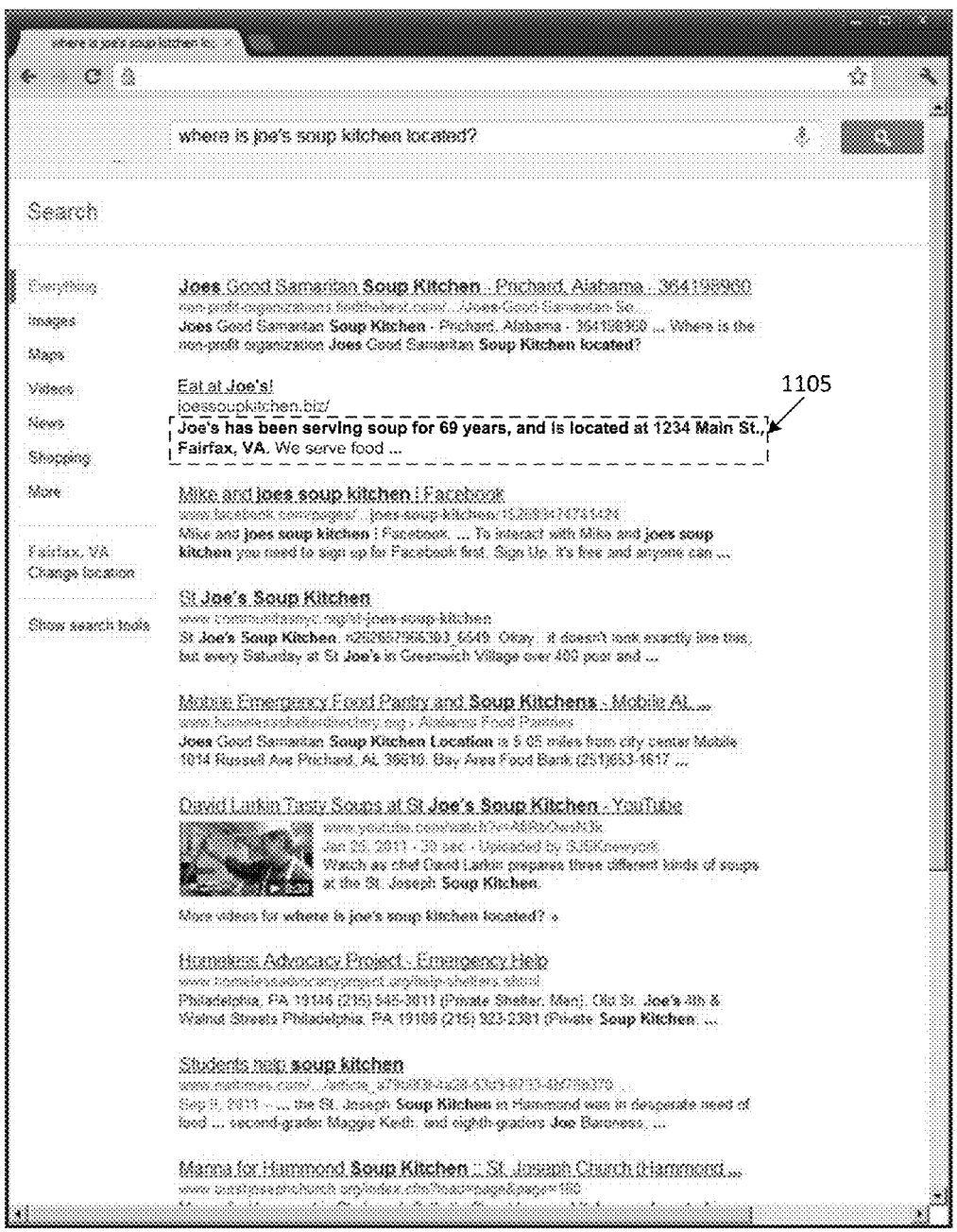

As shown in FIG. 11A, search result presentation document 1100 may include snippets associated with search results. A particular snippet 1105 may be identified as an answer to the question. Based on snippet 1105 being identified as an answer to the question, some or all of the snippet may be presented more prominently. For example, the snippet may be presented using a different—e.g., bold—typeface.

Figure 11B:
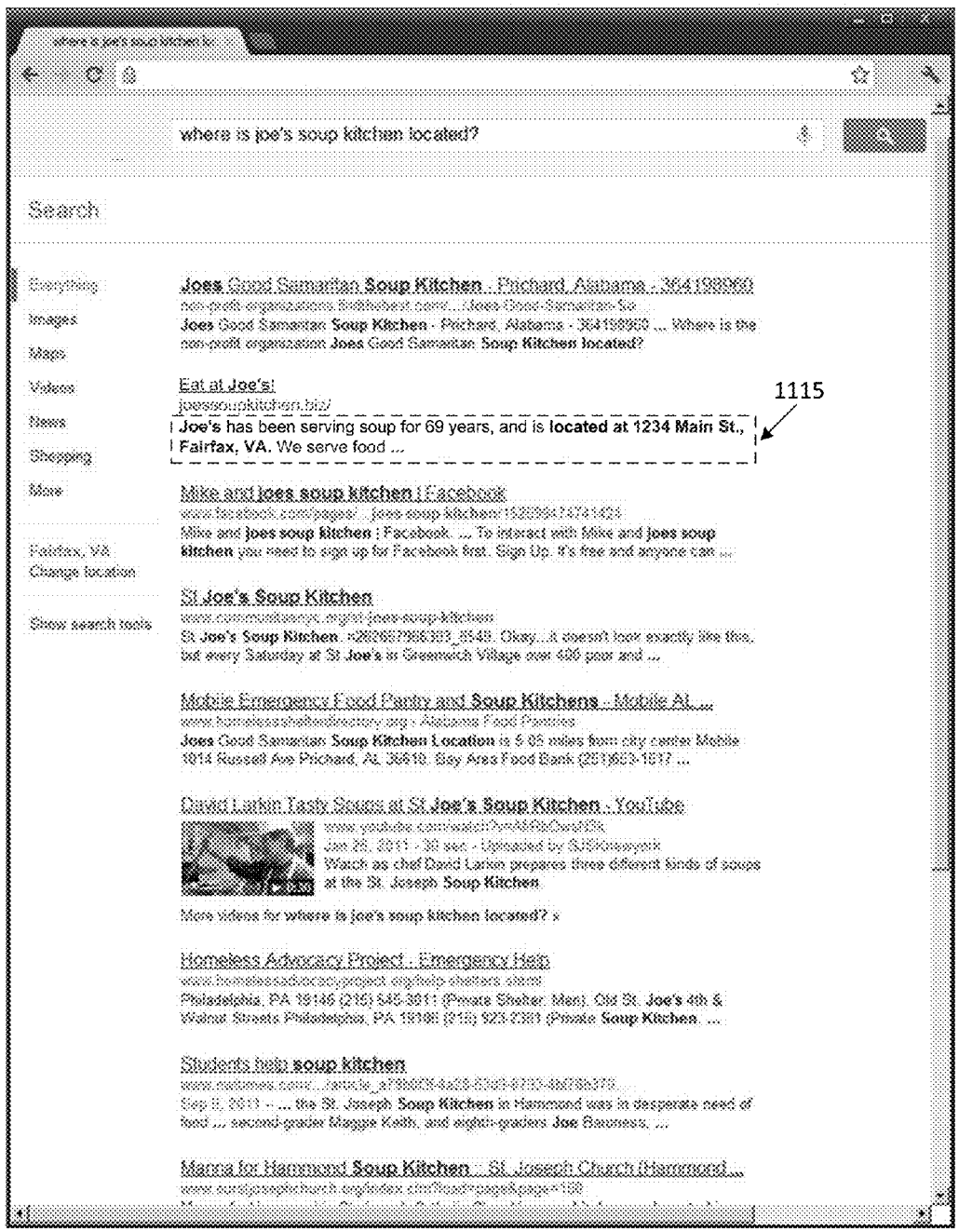

As shown in FIG. 11B, search result presentation document 1110 may include snippets associated with search results, such as snippet 1115. In some implementations, a particular portion of snippet 1115 may be presented using a more prominent—e.g., bold—typeface than other portions of snippet 1115 and/or than other snippets, based on the particular portion including terms that are associated with an identified attribute type—e.g., "located at" may be associated with an attribute type of "address"—and/or terms that are associated with an identified attribute value—e.g., "1234 Main St., Fairfax, VA."

Figure 11C:
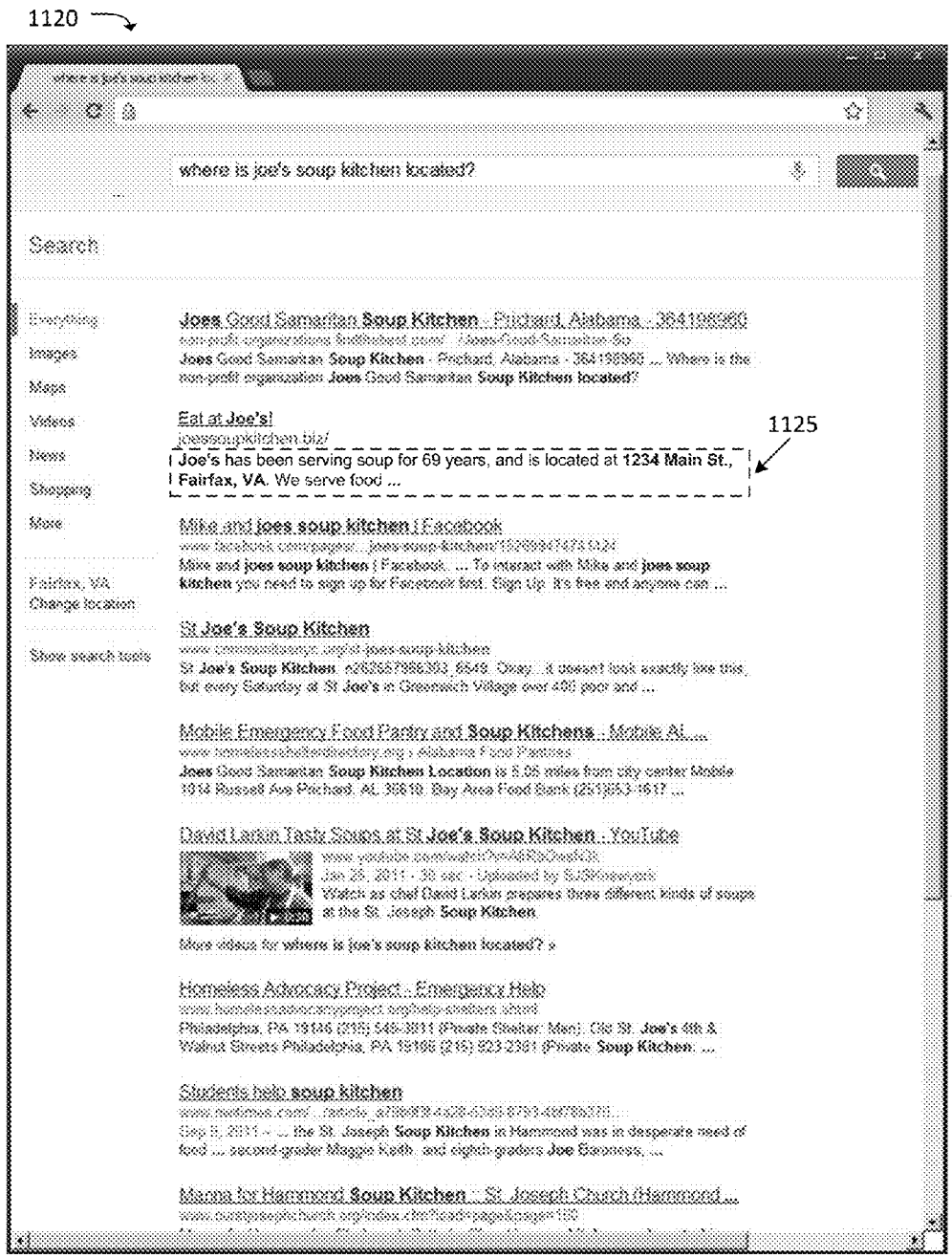

As shown in FIG. 11C, search result presentation document 1120 may include snippets associated with search results, such as snippet 1125. In some implementations, a particular portion of snippet 1125 may be presented using a more prominent—e.g., bold—typeface than other portions of snippet 1125 and/or than other snippets, based on the particular portion including terms that are associated with an attribute type of "address"—and/or terms that are associated with an identified attribute value—e.g., "1234 Main St., Fairfax, VA."

Some implementations, described herein, may allow one or more devices to identify entity-triggering queries. Furthermore, one or more devices, according to some implementations, may be configured to provide responses that are associated with entities in response to entity-triggering queries, thus enhancing users' experiences.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 8 and 9, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method, comprising:
receiving a question at a computing device;
determining that the question includes one or more terms that are associated with an attribute that is defined for one or more entities in an entity information repository;
in response to determining that the question includes one or more terms that are associated with the attribute that is defined for one or more entities in the entity information repository:
obtaining a search result set in response to the question;

identifying, using the computing device, one or more candidate entities that are (i) identified in the entity information repository, and (ii) associated with at least one document referenced by the search result set;

selecting, using the computing device, a particular entity, from among the candidate entities, that is associated with one or more terms of, or an entity identified from, the question;

obtaining a value that is stored for the attribute of the particular entity in the entity information repository;

generating an answer to the question based at least on the value that is stored for the attribute of the particular entity in the entity information repository; and providing, using the computing device, the answer to the question, for output.

2. The method of claim 1, wherein selecting a particular entity from a plurality of candidate entities further comprises:
generating a score for each entity of the plurality of candidate entities; and
selecting one or more entities of the plurality of candidate entities based on the score.

3. The method of claim 1, wherein the score for an entity in the plurality of candidate entities is generated based on one or more of:
a quantity of search results in which the entity was identified,
a proportion of search results in which the entity was identified,
an occurrence of an identifier for the entity in one or more snippets associated with search results,
a result score associated with a search result in which the entity was identified,
a quantity of times that an identifier appears in a particular search result, whether the entity matches one or more terms for the question, or
an indication of whether a particular search result is spam.

4. The method of claim 1, wherein identifying that an entity is associated with (i) at least one document referenced by the search result set and (ii) one or more terms of, or an entity identified from, the question comprises:
determining that one or more terms of an entity identifier associated with the entity are indicated as identical or similar to one or more terms of, or an entity identified from, the question.

5. The method of claim 1, wherein generating an answer to the question further comprises:
analyzing one or more terms of the question to identify one or more of the attributes of the selected entity being requested by the question.

6. The method of claim 1, wherein generating an answer to the question further comprises:
analyzing one or more snippets from a plurality of snippets associated with the search result set that includes one or more identifiers of the selected entity and selecting a snippet from the plurality of snippets as an answer to the question.

7. The method of claim 6, wherein selecting a snippet as an answer to the question comprises:
generating a snippet confidence score for each snippet from the plurality of snippets associated with the search result set based on identifying one or more terms in the snippet that are that associated with the identified attribute of the selected entity; and
selecting a snippet from the plurality of snippets as an answer to the question based on the snippet confidence score.

8. The method of claim 1, wherein providing the answer to the question for output further comprises:
generating an answer document that comprises information about the search result set and the answer.

9. A system comprising:
one or more computers and one or more storage devices storing instructions that are operable, when executed by the one or more computers, to cause the one or more computers to perform operations comprising:
receiving a question at a computing device;
determining that the question includes one or more terms that are associated with an attribute that is defined for one or more entities in an entity information repository;
in response to determining that the question includes one or more terms that are associated with the attribute that is defined for one or more entities in the entity information repository:
obtaining a search result set in response to the question;
identifying, using the computing device, one or more candidate entities that are (i) identified in the entity information repository, and (ii) associated with at least one document referenced by the search result set;
selecting, using the computing device, a particular entity, from among the candidate entities, that is associated with one or more terms of, or an entity identified from, the question;
obtaining a value that is stored for the attribute of the particular entity in the entity information repository;
generating an answer to the question based at least on the value that is stored for the attribute of the particular entity in the entity information repository; and
providing, using the computing device, the answer to the question, for output.

10. The system of claim 9, wherein selecting a particular entity from a plurality of candidate entities further comprises:
generating a score for each entity of the plurality of candidate entities; and
selecting one or more entities of the plurality of candidate entities based on the score.

11. The system of claim 9, wherein the score for an entity in the plurality of candidate entities is generated based on one or more of:
a quantity of search results in which the entity was identified,
a proportion of search results in which the entity was identified,
an occurrence of an identifier for the entity in one or more snippets associated with search results,
a result score associated with a search result in which the entity was identified,
a quantity of times that an identifier appears in a particular search result, whether the entity matches one or more terms for the question, or
an indication of whether a particular search result is spam.

12. The system of claim 9, wherein identifying that an entity is associated with (i) at least one document referenced by the search result set and (ii) one or more terms of, or an entity identified from, the question comprises:
determining that one or more terms of an entity identifier associated with the entity are indicated as identical or similar to one or more terms of, or an entity identified from, the question.

13. The system of claim 9, wherein generating an answer to the question comprises:

analyzing one or more terms of the question to identify one or more of the attributes of the selected entity being requested by the question.

14. The system of claim 9, wherein generating an answer to the question comprises:

analyzing one or more snippets from a plurality of snippets associated with the search result set that includes one or more identifiers of the selected entity and selecting a snippet from the plurality of snippets as an answer to the question.

15. The system of claim 14, wherein selecting a snippet as an answer to the question comprises:

generating a snippet confidence score for each snippet from the plurality of snippets associated with the search result set based on identifying one or more terms in the snippet that are that associated with the identified attribute of the selected entity; and selecting a snippet from the plurality of snippets as an answer to the question based on the snippet confidence score.

16. The system of claim 9, wherein providing the answer to the question for output further comprises:

generating an answer document that comprises information about the search result set and the answer.

17. A non-transitory computer-readable medium storing software comprising instructions executable by one or more computers which, upon such execution, cause the one or more computers to perform operations comprising:

receiving a question at a computing device;

determining that the question includes one or more terms that are associated with an attribute that is defined for one or more entities in an entity information repository;

in response to determining that the question includes one or more terms that are associated with the attribute that is defined for one or more entities in the entity information repository:

obtaining a search result set in response to the question;

identifying, using the computing device, one or more candidate entities that are (i) identified in the entity information repository, and (ii) associated with at least one document referenced by the search result set;

selecting, using the computing device, a particular entity, from among the candidate entities, that is associated with one or more terms of, or an entity identified from, the question;

obtaining a value that is stored for the attribute of the particular entity in the entity information repository;

generating an answer to the question based at least on the value that is stored for the attribute of the particular entity in the entity information repository; and providing, using the computing device, the answer to the question, for output.

18. The medium of claim 17, wherein selecting a particular entity from a plurality of candidate entities further comprises:

generating a score for each entity of the plurality of candidate entities; and selecting one or more entities of the plurality of candidate entities based on the score.

19. The medium of claim 17, wherein the score for an entity in the plurality of candidate entities is generated based on one or more of:

a quantity of search results in which the entity was identified, a proportion of search results in which the entity was identified, an occurrence of an identifier for the entity in one or more snippets associated with search results, a result score associated with a search result in which the entity was identified, a quantity of times that an identifier appears in a particular search result, whether the entity matches one or more terms for the question, or an indication of whether a particular search result is spam.

20. The medium of claim 17, wherein identifying that an entity is associated with (i) at least one document referenced by the search result set and (ii) one or more terms of, or an entity identified from, the question comprises:

determining that one or more terms of an entity identifier associated with the entity are indicated as identical or similar to one or more terms of, or an entity identified from, the question.

21. The medium of claim 17, wherein providing the answer to the question for output further comprises:

generating an answer document that comprises information about the search result set and the answer.

* * * * *